US012803830B2

(12) United States Patent
Zhang et al.

(10) Patent No.: US 12,803,830 B2
(45) Date of Patent: Nov. 17, 2026

(54) ETHERNET CONTROL METHOD AND DEVICE USED IN NETWORK TERMINAL

(71) Applicant: NANJING QINHENG MICROELECTRONICS CO., LTD., Nanjing (CN)

(72) Inventors: Hui Zhang, Nanjing (CN); Shuai Liu, Nanjing (CN); Hongyuan Zhu, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 90 days.

(21) Appl. No.: 18/963,899

(22) Filed: Nov. 29, 2024

(65) Prior Publication Data

US 2025/0097062 A1 Mar. 20, 2025

(51) Int. Cl.

| | |
|---|---|
| ***H04L 12/12*** | (2006.01) |
| ***H04L 61/5007*** | (2022.01) |
| ***H04L 61/5014*** | (2022.01) |
| ***H04L 61/5092*** | (2022.01) |
| ***H04L 101/659*** | (2022.01) |

(52) U.S. Cl.

CPC .......... *H04L 12/12* (2013.01); *H04L 61/5007* (2022.05); *H04L 61/5014* (2022.05); *H04L 61/5092* (2022.05); *H04L 2101/659* (2022.05)

(58) Field of Classification Search

CPC . H04L 12/12; H04L 61/5007; H04L 61/5014; H04L 61/5092; H04L 2101/659

See application file for complete search history.

(56) References Cited

U.S. PATENT DOCUMENTS

| | | | | |
|---|---|---|---|---|
| 7,352,289 | B1 * | 4/2008 | Harris | H04Q 9/00 324/67 |
| 7,657,762 | B2 * | 2/2010 | Orr | G06F 1/325 713/300 |
| 8,924,518 | B2 * | 12/2014 | Witchey | H04L 69/08 709/227 |
| 9,519,327 | B2 * | 12/2016 | Imao | G06F 1/3209 |
| 9,955,217 | B2 * | 4/2018 | Kwon | H04N 5/45 |
| 12,436,910 | B2 * | 10/2025 | Chien | G06F 21/70 |
| 2007/0041388 | A1 * | 2/2007 | Russell | H04L 61/5014 370/465 |
| 2007/0162594 | A1 * | 7/2007 | Henry | G06F 11/1441 709/224 |

* cited by examiner

*Primary Examiner* — Thomas J Dailey

(74) *Attorney, Agent, or Firm* — CBM PATENT CONSULTING, LLC

(57) ABSTRACT

An Ethernet control method in a network terminal comprises the following steps of: after initialization, acquiring, by a system terminal, an IPv6 Link-Local address of a first Ethernet module of the network terminal; when the system terminal receives a network startup trigger signal, issuing a network startup command, wherein the network startup command is an IPv6 data packet; receiving, by a device terminal, the network startup command, simulating unplugging, plugging and reconnection of a network cable; issuing, by the system terminal, an address acquisition request to acquire an IP address; when the system terminal receives a network shutdown trigger signal, issuing a network shutdown command; after the device terminal receives the command, simulating unplugging, plugging and reconnection of the network cable; and issuing, by the system terminal, the address acquisition request, but being unable to acquire the IP address.

13 Claims, 3 Drawing Sheets

ETHERNET CONTROL METHOD AND DEVICE USED IN NETWORK TERMINAL

CROSS-REFERENCE TO RELATED APPLICATIONS

This application claims priority to Chinese Patent Application Ser. No. CN2024106076864 filed on 16 May 2024.

TECHNICAL FIELD

The present invention relates to the technical field of network communication, and particularly to an Ethernet control method used in a network terminal.

BACKGROUND

In some application scenarios, there is a need to control the on-off of a network as required under the condition that a network cable of a network terminal is physically connected all the time. For example, in the case of an application scenario of TV, users may watch network television when using the TV, or the users may watch live television by accessing a set-top box. The two systems of TV and set-top box need to be switched by two remote controllers, thus bringing a lot of inconvenience. However, the set-top box itself is high in cost, an extra power supply plug-in position and an HDMI (High-Definition Multimedia Interface) cable are needed, and multiple devices and wires greatly affect the appearance. If the users want to omit the set-top box, IPTV (Internet Protocol television) software needs to be mounted on the TV, and then there is the problem of switching between a private network (live television) and a public network (network television), which is the problem of switching between wired and wireless networks. In the case of the wired network, in order to improve the user experience, a network cable of the private network needs to be connected with the television all the time, without manually plugging and unplugging the network cable, and the on-off control of the wired network is realized through software as required, which means to control the switching of an Ethernet network from a startup state to a shutdown state and from the shutdown state to the startup state.

When the network is disconnected, a system terminal and a device terminal are in a false connection state, so that the system terminal cannot acquire an effective address, and the device terminal cannot receive a network startup command. Therefore, the switching of the Ethernet network from the shutdown state to the startup state cannot be realized.

A normal network is usually shut down by disabling a network controller or unplugging a network cable. However, in systems such as an Android system product, because there is no ROOT authority and no interface required for software development, it is impossible to control the network controller by software, and manual plugging and unplugging require manual participation, thus being very inconvenient.

SUMMARY

Object of the present invention: in order to solve the problem that an Ethernet network cannot be started up and shut down under the condition that a network cable of a network terminal is physically connected all the time in the prior art, the present invention provides an Ethernet control method and device used in a network terminal.

Technical solution: an Ethernet control method used in a network terminal comprises the following steps of:

initializing a system terminal and a device terminal;

acquiring, by the system terminal, an IPv6 Link-Local address of a first Ethernet module of the network terminal, wherein the system terminal is first application software mounted on the network terminal, and connecting a second Ethernet module of the device terminal with the first Ethernet module of the network terminal through a network cable;

when the system terminal receives a network startup trigger signal, issuing, by the system terminal, a network startup command, wherein the network startup command is an IPv6 data packet; receiving, by the device terminal, the network startup command, simulating unplugging, plugging and reconnection of the network cable, and ensuring that an address management module is in a startup state during reconnection; and issuing, by the system terminal, an address acquisition request to acquire an IP address allocated by the address management module, so that an Ethernet network is started up, wherein the address management module is a DHCP (Dynamic Host Configuration Protocol) server; and when the system terminal receives a network shutdown trigger signal, issuing, by the system terminal, a network shutdown command to the device terminal; after the device terminal receives the network shutdown command, simulating unplugging, plugging and reconnection of the network cable, and ensuring that the address management module is in a shutdown state during reconnection; and issuing, by the system terminal, the address acquisition request, but being unable to acquire the IP address, so that the Ethernet network is shut down.

Further, after the device terminal receives the network startup command, the address management module is enabled first, and then the unplugging, plugging and reconnection of the network cable are simulated; and after the device terminal receives the network shutdown command, the address management module is disabled first, and then the unplugging, plugging and reconnection of the network cable are simulated.

Further, a method of simulating the unplugging, plugging and reconnection of the network cable comprises any one or more of the following modes of: resetting a device-terminal PHY (Physical Layer); resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the second Ethernet module of the device terminal and then starting up the second Ethernet module of the device terminal; shutting down the first Ethernet module of the system terminal and then starting up the first Ethernet module of the system terminal, wherein the first Ethernet module and the second Ethernet module are network modules with an Ethernet communication capability; resetting the device terminal; resetting the system terminal; shutting down the device terminal and then starting up the device terminal; shutting down the system terminal and then starting up the system terminal; and changing an IP acquisition mode of the first Ethernet module of the system terminal.

Further, the network startup trigger signal is triggered by opening the first application software on the system side; and the network shutdown trigger signal is triggered by closing the first application software on the system side.

Further, the network shutdown command is an IPv4 (Internet Protocol version 4) data packet or the IPv6 (Internet Protocol version 6) data packet.

An Ethernet control device used in a network terminal comprises a system terminal and a device terminal, wherein the system terminal is first application software mounted on the network terminal, and the system terminal comprises a network management module, a command transceiving module and an address request module; the network management module is configured for acquiring an IPv6 Link-Local address and receiving a network startup or shutdown trigger signal to manage startup and shutdown of the network; the command transceiving module is configured for issuing a network startup command or a network shutdown command, wherein the network startup command is an IPv6 data packet; and the address request module is configured for issuing an address acquisition request, and the address request module is a DHCP server; and the device terminal comprises a second Ethernet module, a protocol processing module, a network startup and shutdown control module, a state update module and an address management module; the second Ethernet module of the device terminal is connected with the first Ethernet module of the network terminal through a network cable; the protocol processing module is configured for receiving and parsing the network startup command or the network shutdown command; the network startup and shutdown control module is configured for enabling the address management module when receiving the network startup command and disabling the address management module when receiving the network shutdown command; the state update module is configured for simulating unplugging, plugging and reconnection of the network cable; and the address management module is configured for receiving the address acquisition request issued by the system terminal and allocating an IP address to the system terminal in a startup state.

Further, the state update module is configured for simulating the unplugging, plugging and reconnection of the network cable, which comprises any one or more of the following modes of: resetting a device-terminal PHY; resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the second Ethernet module of the device terminal and then starting up the second Ethernet module of the device terminal; shutting down the first Ethernet module of the system terminal and then starting up the first Ethernet module of the system terminal, wherein the first Ethernet module and the second Ethernet module are network modules with an Ethernet communication capability; resetting the device terminal; resetting the system terminal; shutting down the device terminal and then starting up the device terminal; shutting down the system terminal and then starting up the system terminal; and changing an IP acquisition mode of the first Ethernet module of the system terminal.

Further, the first Ethernet module is one of a computer network card, and an Ethernet controller embedded in MCU (Micro Controller Unit) or externally arranged, the second Ethernet module is one of a computer network card, and an Ethernet controller embedded in MCU or externally arranged, and the computer network card is a computer internal network card or a computer external network card.

Further, the network terminal is one of a TV, a computer, a tablet and a mobile phone.

Compared with the prior art, the present invention provides the Ethernet control method and device used in the network terminal, with the following beneficial effects:

under the condition that the network cable of the network terminal is physically connected all the time, without plugging and unplugging, the on-off of the network can be controlled as required, which can greatly improve the use experience of the product; even when the Ethernet network is in the shutdown state, the network may still be started up; by simulating the unplugging, plugging and reconnection of the network cable, the system terminal can be triggered to quickly issue the address acquisition request during network state switching, so that the network state switching is fast in speed; the application to various systems and the high system compatibility are realized; and there is no need to change a native network communication mode of other application software on the network terminal.

DETAILED DESCRIPTION

The present invention is further explained and described hereinafter with reference to the drawings and specific embodiments.

Figure 1:
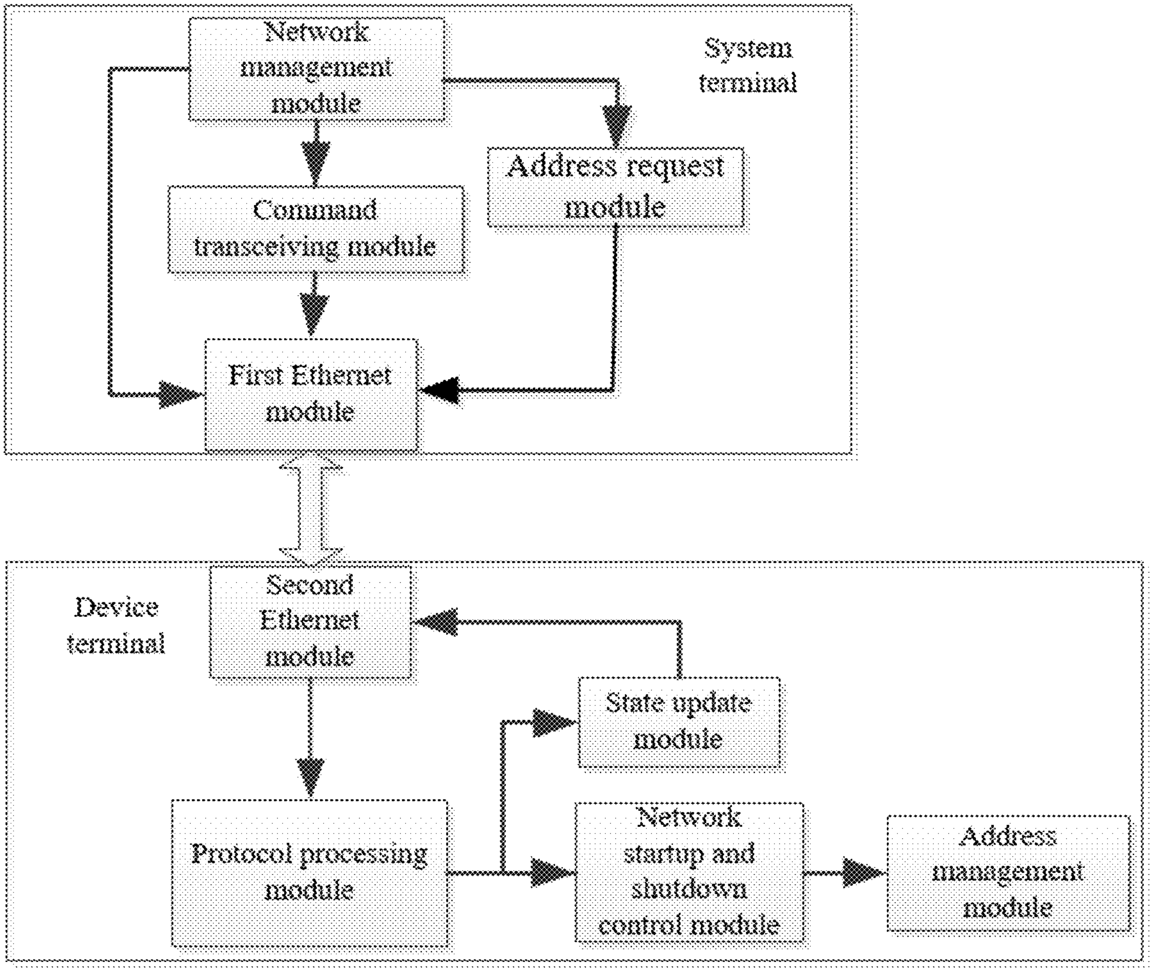
FIG. 1 is a structure block diagram of an Ethernet control device used in a network terminal.

An Ethernet control device used in a network terminal, as shown in FIG. 1, comprises a system terminal and a device terminal, wherein the system terminal is first application software mounted on the network terminal, the network terminal may be a TV, a computer, a tablet, a mobile phone, a multimedia device, and the like, and the system may be Android, Windows, and the like. In order to understand the technical solution, modules in the figure are connected by unidirectional arrows, but there is actually bidirectional signal transmission.

The system terminal comprises a network management module, a command transceiving module and an address request module. The network management module is configured for acquiring an IPv6 Link-Local address and receiving a network startup or shutdown trigger signal to manage startup and shutdown of the network; the command transceiving module is configured for issuing a network startup command or a network shutdown command, wherein the network startup command is an IPv6 data packet; and the address request module is configured for issuing an address acquisition request.

The device terminal comprises a second Ethernet module, a protocol processing module, a network startup and shutdown control module, a state update module and an address management module. The second Ethernet module of the device terminal is connected with the first Ethernet module of the network terminal through a network cable; the protocol processing module is configured for receiving and parsing the network startup command or the network shutdown command; the network startup and shutdown control module is configured for enabling the address management module when receiving the network startup command and disabling the address management module when receiving the network shutdown command; the state update module is configured for simulating unplugging, plugging and reconnection of the network cable; and the address management module is configured for receiving the address acquisition request issued by the system terminal and allocating an IP address to the system terminal in a startup state. The address management module comprises a DHCP Server.

The state update module is configured for simulating the unplugging, plugging and reconnection of the network cable, which is realized by any one or a combination of several of the following modes of: resetting a device-terminal PHY; resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the second Ethernet module of the device terminal and then starting up the second Ethernet module of the device terminal; shutting down the first Ethernet module of the system terminal and then starting up the first Ethernet module of the system terminal; resetting the device terminal; resetting the system terminal; shutting down the device terminal and then starting up the device terminal; shutting down the system terminal and then starting up the system terminal; and changing an IP acquisition mode of the first Ethernet module, such as changing from static acquisition to dynamic acquisition, or changing from dynamic acquisition to static acquisition. The main purpose of simulating the unplugging, plugging and reconnection of the network cable is to trigger the system terminal to quickly issue the address acquisition request.

The first Ethernet module and the second Ethernet module are network modules with an Ethernet communication capability.

The first Ethernet module is one of a computer network card (network adapter), and an Ethernet controller embedded in MCU or externally arranged, the second Ethernet module is one of a computer network card, and an Ethernet controller embedded in MCU or externally arranged, and the computer network card is a computer internal network card or a computer external network card.

In fact, the network management module also needs to judge whether a network interface of the Ethernet module is connected with the network cable. The command transceiving module also needs to exchange commands such as state query with the device terminal, and the command transceiving module exchanges commands with the device terminal through a system Socket assembly. The protocol processing module needs to be able to parse an IPv4 data packet and the IPv6 data packet.

Figure 2:
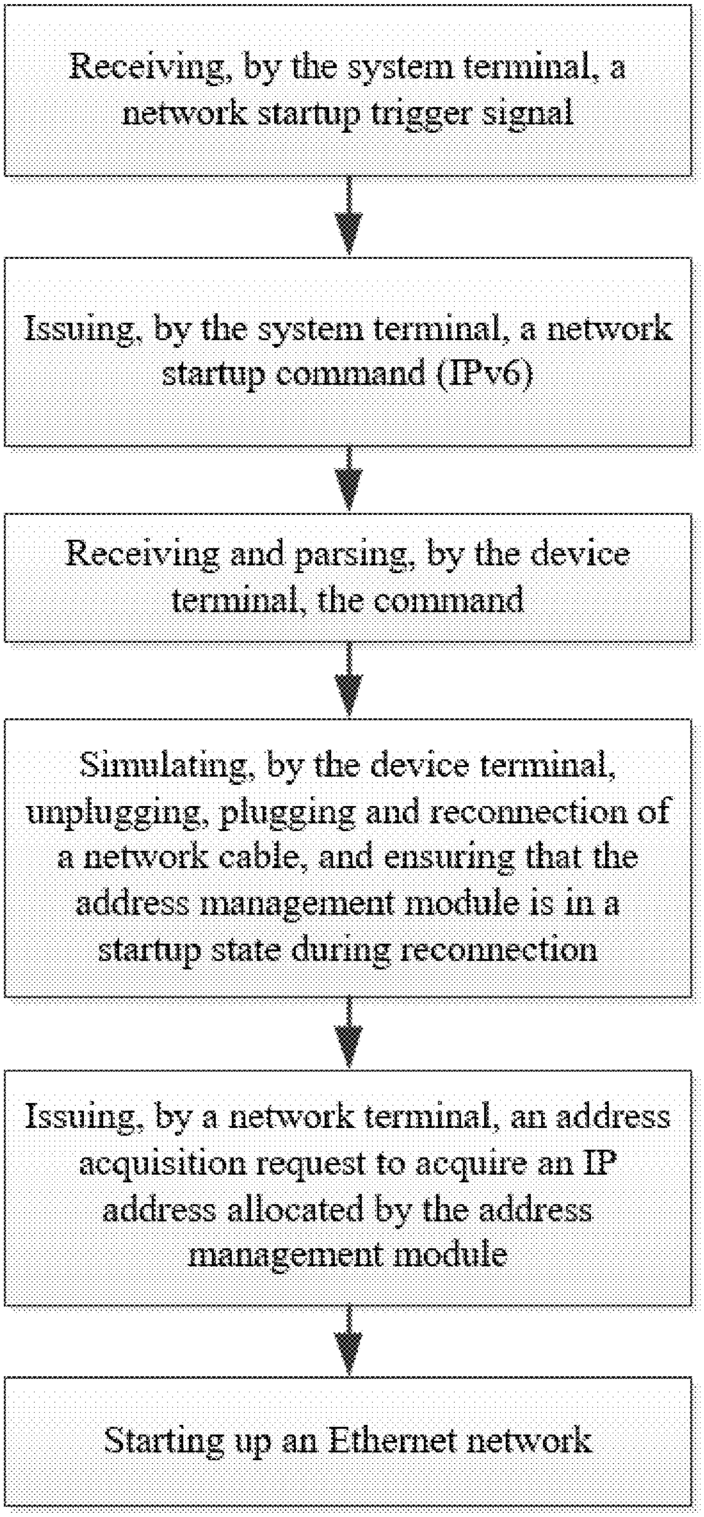
FIG. 2 is a flow chart of startup of a network.
Figure 3:
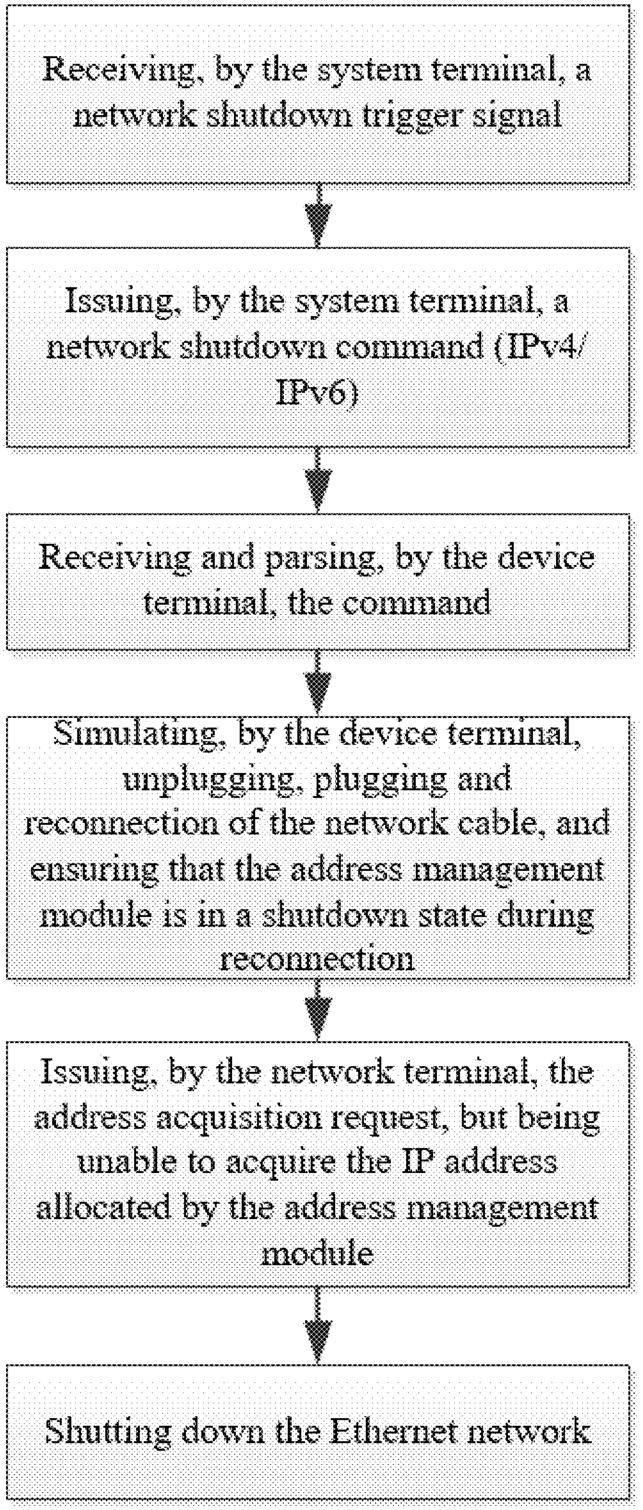
FIG. 3 is a flow chart of shutdown of the network.

An Ethernet control method used in a network terminal comprises the following steps of:

initializing a system terminal and a device terminal;

acquiring, by the system terminal, an IPv6 Link-Local address of a first Ethernet module of the network terminal;

as shown in FIG. 2, when the system terminal receives a network startup trigger signal, issuing, by the system terminal, a network startup command, wherein the network startup command is an IPv6 data packet; receiving, by the device terminal, the network startup command, simulating unplugging, plugging and reconnection of the network cable, and ensuring that an address management module is in a startup state during reconnection; and issuing, by the system terminal, an address acquisition request to acquire an IP address allocated by the address management module, so that an Ethernet network is started up; and as shown in FIG. 3, when the system terminal receives a network shutdown trigger signal, issuing, by the system terminal, a network shutdown command to the device terminal; after the device terminal receives the network shutdown command, simulating unplugging, plugging and reconnection of the network cable, and ensuring that the address management module is in a shutdown state during reconnection; and issuing, by the system terminal, the address acquisition request, but being unable to acquire the IP address, so that the Ethernet network is shut down.

Because an IPv4 address is allocated by DHCP, the IPv6 Link-Local address is allocated by the system. Before the Ethernet network is started up, the system terminal and the device terminal are in a false connection state, so that the system terminal cannot acquire the IPv4 address, but the system terminal may acquire the IPv6 Link-Local address. Therefore, the IPv6 data packet may be used to send the network startup command, so that the device terminal can receive the command.

The network shutdown command is an IPv4 data packet or the IPv6 data packet. The IPv4 address is acquired when the Ethernet network is started up, so that the IPv4 data packet may be used to send the network shutdown command during shutdown of the network. Certainly, because the IPv6 Link-Local address has been acquired, the IPv6 data packet may also be used to send the network shutdown command.

In order to ensure that the address management module is in a required state when simulating unplugging, plugging and reconnection of the network cable, this embodiment is implemented as follows.

After the device terminal receives the network startup command, the address management module is enabled first, then the second Ethernet module of the device terminal is shut down, and the second Ethernet module of the device terminal is started up. In fact, the second Ethernet module of the device terminal may also be shut down first, then the address management module is enabled, and finally the second Ethernet module of the device terminal is started up. As long as the address management module is ensured to be in the startup state after simulating reconnection, the address management module can allocate the IP address to the system terminal after the reconnection triggers the system terminal to issue the address acquisition request.

After the device terminal receives the network shutdown command, the address management module is disabled first, then the second Ethernet module of the device terminal is shut down, and the second Ethernet module of the device terminal is started up. In fact, the second Ethernet module of the device terminal may also be shut down first, then the address management module is disabled, and finally the second Ethernet module of the device terminal is started up. As long as the address management module is ensured to be in the shutdown state after simulating reconnection, the IP address cannot be acquired after the reconnection triggers the system terminal to issue the address acquisition request.

In addition to shutting down and starting up the Ethernet module, according to an actual situation, the method for simulating the unplugging, plugging and reconnection of the network cable may also comprise any one and even a combination of several of the following modes of: resetting a device-terminal PHY; resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the first Ethernet module of the system terminal and then starting up the first Ethernet module of the system terminal; resetting the device terminal; resetting the system terminal; shutting down the device terminal and then starting up the device terminal; shutting down the system terminal and then starting up the system terminal; and changing an IP acquisition mode of the first Ethernet module of the system terminal, such as changing from static acquisition to dynamic acquisition, or changing from dynamic acquisition to static acquisition.

The network startup trigger signal is triggered by opening the first application software on the system side; and the network shutdown trigger signal is triggered by closing the first application software on the system side, which means that, when a user uses the network terminal, if the first application software is started up, the Ethernet network is automatically started up under operation of an Ethernet control device, and if the first application software is shut down, the Ethernet network is automatically shut down under the operation of the Ethernet control device, and the network may be started up and shut down repeatedly. In addition, other trigger conditions may also be set according to use scenarios. Moreover, in the whole process of state switching of the Ethernet network, the network cable is physically connected all the time, and the Ethernet network may be controlled to be started up and shut down without actually unplugging and plugging the network cable.

What is claimed is:

1. An Ethernet control method used in a network terminal, comprising the following steps of:

initializing a system terminal and a device terminal;

acquiring, by the system terminal, an IPV6 (Internet Protocol version 6) Link-Local address of a first Ethernet module of the network terminal, wherein the system terminal is application software installed on the network terminal, and connecting a second Ethernet module of the device terminal with the first Ethernet module of the network terminal through a network cable;

when the system terminal receives a network startup trigger signal, issuing, by the system terminal, a network startup command, wherein the network startup command is an IPV6 data packet; receiving, by the device terminal, the network startup command, simulating unplugging, plugging and reconnection of the network cable, and ensuring that an address management module is in a startup state during the reconnection; and issuing, by the system terminal, an address acquisition request to acquire an IP address allocated by the address management module, so that an Ethernet network is started up; and when the system terminal receives a network shutdown trigger signal, issuing, by the system terminal, a network shutdown command to the device terminal; after the device terminal receives the network shutdown command, simulating unplugging, plugging and the reconnection of the network cable, and ensuring that the address management module is in a shutdown state during the reconnection; and issuing, by the system terminal, the address acquisition request, but being unable to acquire the IP address, so that the Ethernet network is shut down, wherein the address management module is a DHCP (Dynamic Host Configuration Protocol) server.

2. The Ethernet control method used in the network terminal according to claim 1, wherein, after the device terminal receives the network startup command, the address management module is enabled first, and then the unplugging, plugging and the reconnection of the network cable are simulated; and after the device terminal receives the network shutdown command, the address management module is disabled first, and then the unplugging, plugging and the reconnection of the network cable are simulated.

3. The Ethernet control method used in the network terminal according to claim 1 or 2, wherein a method of simulating the unplugging, plugging and the reconnection of the network cable comprises any one or more of the following modes of: resetting a device-terminal PHY (Physical Layer); resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the second Ethernet module of the device terminal and then starting up the second Ethernet module of the device terminal; shutting down the first Ethernet module of the system terminal and then starting up the first Ethernet module of the system terminal, wherein the first Ethernet module and the second Ethernet module are network modules with an Ethernet communication capability; resetting the device terminal; resetting the system terminal; shutting down the device terminal and then starting up the device terminal; shutting down the system terminal and then starting up the system terminal; and changing an IP acquisition mode of the first Ethernet module of the system terminal.

4. The Ethernet control method used in the network terminal according to claim 1, wherein the network startup trigger signal is triggered by opening the first application software on the system terminal; and the network shutdown trigger signal is triggered by closing the first application software on the system terminal.

5. The Ethernet control method used in the network terminal according to claim 1, wherein the network shutdown command is an IPV4 (Internet Protocol version 4) data packet or the IPV6 (Internet Protocol version 6) data packet.

6. The Ethernet control method used in the network terminal according to claim 2, wherein the network startup trigger signal is triggered by opening the first application software on the system terminal; and the network shutdown trigger signal is triggered by closing the first application software on the system terminal.

7. The Ethernet control method used in the network terminal according to claim 2, wherein the network shutdown command is an IPV4 (Internet Protocol version 4) data packet or the IPV6 (Internet Protocol version 6) data packet.

8. An Ethernet control device used in a network terminal, comprising a processor, a memory, a system terminal and a device terminal, wherein the system terminal is application software installed on the memory of the network terminal and executable by the processor, and the system terminal comprises a network management module, a command transceiving module and an address request module; the network management module is configured for acquiring an IPV6 Link-Local address and receiving a network startup or shutdown trigger signal to manage startup and shutdown of the network; the command transceiving module is configured for issuing a network startup command or a network shutdown command, wherein the network startup command is an IPV6 data packet; and the address request module is configured for issuing an address acquisition request, and the address request module is a DHCP server; and the device terminal comprises a second Ethernet module, a protocol processing module, a network startup and shutdown control module, a state update module and an address management module; the second Ethernet module of the device terminal is connected with the first Ethernet module of the network terminal through a network cable; the protocol processing module is configured for receiving and parsing the network startup command or the network shutdown command; the network startup and shutdown control module is configured for enabling the address management module when receiving the network startup command and disabling the address management module when receiving the network shutdown command; the state update module is configured for simulating unplugging, plugging and reconnection of the network cable; and the address management module is configured for receiving the address acquisition request issued by the system terminal and allocating an IP address to the system terminal in a startup state.

9. The Ethernet control device used in the network terminal according to claim 8, wherein the state update module is configured for simulating the unplugging, plugging and the reconnection of the network cable, which comprises any one or more of the following modes of: resetting a device-terminal PHY; resetting a system-terminal PHY; shutting down the device-terminal PHY and then starting up the device-terminal PHY; shutting down the system-terminal PHY and then starting up the system-terminal PHY; resetting the second Ethernet module of the device terminal; resetting the first Ethernet module of the system terminal; shutting down the second Ethernet module of the device terminal and then starting up the second Ethernet module of the device terminal; shutting down the first Ethernet module of the system terminal and then starting up the first Ethernet module of the system terminal, wherein the first Ethernet module and the second Ethernet module are network modules with an Ethernet communication capability; resetting the device terminal; resetting the system terminal; shutting down the device terminal and then starting up the device terminal; shutting down the system terminal and then starting up the system terminal; and changing an IP acquisition mode of the first Ethernet module of the system terminal.

10. The Ethernet control device used in the network terminal according to claim 8, wherein the first Ethernet module is one of a computer network card, and an Ethernet controller embedded in MCU (Micro Controller Unit) or externally arranged, the second Ethernet module is one of a computer network card, and an Ethernet controller embedded in MCU or externally arranged, and the computer network card is a computer internal network card or a computer external network card.

11. The Ethernet control device used in the network terminal according to claim 8, wherein the network terminal is one of a TV, a computer, a tablet and a mobile phone.

12. The Ethernet control device used in the network terminal according to claim 9, wherein the first Ethernet module is one of a computer network card, and an Ethernet controller embedded in MCU (Micro Controller Unit) or externally arranged, the second Ethernet module is one of a computer network card, and an Ethernet controller embedded in MCU or externally arranged, and the computer network card is a computer internal network card or a computer external network card.

13. The Ethernet control device used in the network terminal according to claim 9, wherein the network terminal is one of a TV, a computer, a tablet and a mobile phone.

* * * * *